United States Patent
Accinni et al.

(10) Patent No.: US 12,521,360 B2
(45) Date of Patent: Jan. 13, 2026

(54) CALORIC RESTRICTION MIMETIC COMPOSITIONS

(71) Applicant: SOLONGEVITY NUTRACEUTICALS S.r.l., Milan (IT)

(72) Inventors: Roberto Accinni, Milan (IT); Priscilla Biswas, Milan (IT); Alberto Beretta, Milan (IT)

(73) Assignee: SOLONGEVITY NUTRACEUTICALS S.R.L., Milan (IT)

( * ) Notice: Subject to any disclaimer, the term of this patent is extended or adjusted under 35 U.S.C. 154(b) by 641 days.

(21) Appl. No.: 17/917,911

(22) PCT Filed: Apr. 8, 2021

(86) PCT No.: PCT/IB2021/052918
§ 371 (c)(1),
(2) Date: Oct. 7, 2022

(87) PCT Pub. No.: WO2021/205376
PCT Pub. Date: Oct. 14, 2021

(65) Prior Publication Data
US 2023/0149334 A1    May 18, 2023

(30) Foreign Application Priority Data
Apr. 10, 2020   (IT) .................... 102020000007726

(51) Int. Cl.
*A61K 31/198*    (2006.01)
*A61K 31/05*     (2006.01)
(Continued)

(52) U.S. Cl.
CPC ............ *A61K 31/198* (2013.01); *A61K 31/05* (2013.01); *A61K 31/455* (2013.01); *A61K 31/7034* (2013.01)

(58) Field of Classification Search
CPC . A61K 31/198; A61K 31/455; A61K 31/7034
See application file for complete search history.

(56) References Cited

U.S. PATENT DOCUMENTS 9,950,023 B1    4/2018  Tabibian
2016/0367497 A1 12/2016 Milbrandt et al.
(Continued)

FOREIGN PATENT DOCUMENTS

WO  2011/084886   7/2011
WO  2019/138317   7/2019

OTHER PUBLICATIONS

Wang et al. (Phytomedicine, 2015, vol. 22, pp. 553-559) (Year: 2015).*

(Continued)

*Primary Examiner* — Scarlett Y Goon
*Assistant Examiner* — Sarah Grace Scrivener
(74) *Attorney, Agent, or Firm* — Nixon & Vanderhye, PC

(57) ABSTRACT

Caloric restriction mimetic compositions comprising an active agent; the active agent comprises acetylcysteine, at least one compound selected in the group consisting of nicotinamide, nicotinamide riboside (NR), nicotinamide mononucleotide (NMN), at least one compound selected between polydatin and resveratrol.

16 Claims, 2 Drawing Sheets

(51) Int. Cl.
A61K 31/455 (2006.01)
A61K 31/7034 (2006.01)

(56) References Cited

U.S. PATENT DOCUMENTS

2018/0071273 A1* 3/2018 Horn ..................... A61K 31/09
2018/0221397 A1   8/2018 Duronio

OTHER PUBLICATIONS

Oh et al. (Food Sci Biotechnol, 2017, vol. 26, pp. 783-790). (Year: 2017).*
International Search Report for PCT/IB2021/052918 dated Jul. 12, 2021, 4 pages.
Written Opinion of the ISA for PCT/IB2021/052918 dated Jul. 12, 2021, 6 pages.
Canto et al., "The NAD+ Precursor Nicotinamide Riboside Enhances Oxidative Metabolism and Protects against High- Fat Diet-Induced Obesity", Cell Metabolism, Cell Press V01. 15, No. 6, pages 838-847 (2012).
Baur et a., "Resveratrol improves health and survival of mice on a high-calorie diet" Nature vol. 444, No. 7117, pp. 337-342 (2006).

* cited by examiner

CALORIC RESTRICTION MIMETIC COMPOSITIONS

CROSS-REFERENCE TO RELATED APPLICATIONS

This application is the U.S. national phase of International Application No. PCT/IB2021/052918 filed Apr. 8, 2021 which designated the U.S. and claims priority to IT patent application No. 102020000007726 filed Apr. 10, 2020, the entire contents of each of which are hereby incorporated by reference.

FIELD OF THE INVENTION

The present description refers to caloric restriction mimetic compositions; in particular, to compositions particularly suitable for contrasting and treating prediabetes and diabetes.

BACKGROUND

Among metabolic alterations, a condition of altered glycaemia, such as prediabetes (or hyperglycemia) represents a potential alarm bell for the onset of type 2 diabetes. In prediabetes, blood glucose levels are higher than the ones observed in healthy subjects but do not reach the values observed in diabetic patients. Prediabetes is a reversible condition that can be treated. To date, the guidelines invite the use of the term "glucose intolerance" or "dysglycemia" rather than "prediabetes" precisely to emphasize that a condition of prediabetes does not necessarily evolve into diabetes, but that this condition can represent a risk factor for diabetes and cardiovascular disease. By monitoring and treating prediabetes it is-in fact-possible to reduce the risk of developing the actual disease and consequently its complications. Long-term side effects, especially to cardiovascular system, can already occur in the prediabetes phase and are very often not identified promptly because they are mostly asymptomathic.

To date, there are no approved drugs for preventing and treating prediabetes; however, it is known that a balanced diet, adequate sports activity, and correct nutritional supplementation can help to counteract the evolution of prediabetes into type 2 diabetes.

Furthermore, prediabetes is one of the pathophysiological conditions most frequently associated with aging. The study of the causes and mechanisms underlying the aging process can open up new preventive and/or therapeutic strategies against associated diseases, in particular diabetes. This is because the mechanisms that lead to insulin resistance fall within a general framework of pathophysiological imbalances typical of the aging organism. The primary causes of aging identified in the last 20 years include damage to DNA (due, for example, to genomic instability and shortening of telomeres), epigenetic (due to epigenetic alterations) and proteins (due to loss of protein homeostasis). There are also three pathways defined as antagonistic as they concern compensatory mechanisms that occur primarily to respond to the damage, and initially mitigate it, but if they are chronic or exacerbated they themselves become deleterious. These pathways are cellular senescence, mitochondrial dysfunction and the dysregulation of nutrient-sensing mechanisms. Some metabolic pathways are involved in the phenomena of dysregulation of nutrient detection mechanisms, the main one being the insulin-IGF-1 system (IIS), the mTOR pathway, sirtuins and adenine monophosphate kinase (AMPK). The first two pathways detect glucose and amino acid levels, respectively, while the last two detect energy levels by means of the ratio of NAD+/NADH, AMP/ATP and ADP/ATP.

A nutritional regimen of reduced caloric intake, commonly known as "caloric restriction" (CR) has proved capable of inducing an important pro-longevity effect in various animal species (such as, for example, in yeast, nematodes, insects, and in mammals such as mice and primates). Recent clinical studies also confirm its effectiveness in humans, especially in reducing co-morbidities, first of all diabetes, associated with unhealthy aging.

CR, in its many forms (e.g. fasting at various intervals, diet programs that mimic fasting, various nutritional regimens), acts in various ways precisely on the mechanisms involved in the detection of nutrients. In general, the inhibition of insulin-IGF-1 (IIS) and the mTOR pathway and the activation of sirtuins and AMPK exert pro-longevity effects. Physical exercise, although documented to a lesser extent, also has an effect similar to CR. A caloric restriction regimen, however, may not be suitable for all patient groups. Poor adherence to certain dietary programs, intermittent fasting or physical exercise, for example, in an elderly and often sedentary population, would nullify the potentially achievable beneficial effects.

SUMMARY OF THE INVENTION

The object of the present description is to provide compositions capable of mimicking the positive effects of caloric restriction while overcoming the aforesaid drawbacks. According to the invention, the aforesaid object is achieved thanks to the subject specifically referred to in the following claims, which are intended as an integral part of the present description.

One embodiment of the present description provides a caloric restriction mimetic composition, the composition comprises an active agent which contains:
- acetylcysteine,
- at least one compound selected from the group consisting of nicotinamide (NAM), nicotinamide riboside (NR), nicotinamide mononucleotide (NMN),
- at least one compound selected from polydatin and resveratrol.

In one or more embodiments, the active agent comprises acetylcysteine, nicotinamide, polydatin.

A further embodiment of the present description provides a method for preventing and treating prediabetes and diabetes in a subject, the method comprising selecting a composition comprising an active agent containing acetylcysteine, at least one compound selected from nicotinamide (NAM), nicotinamide riboside (NR), nicotinamide mononucleotide (NMN), and polydatin, and administering the composition to the subject.

The description also provides a method for preventing and treating prediabetes and diabetes, the method comprising administering a therapeutically effective amount of the disclosed compositions to the subject.

In one or more embodiments, the compositions described herein can also be used in medicine, particularly in preventing and/or treating prediabetes and diabetes.

BRIEF DESCRIPTION OF THE DRAWINGS

The invention will now be described, by way of example, with reference to the attached figures, wherein.

DETAILED DESCRIPTION OF PREFERRED EMBODIMENTS

Figure 1:
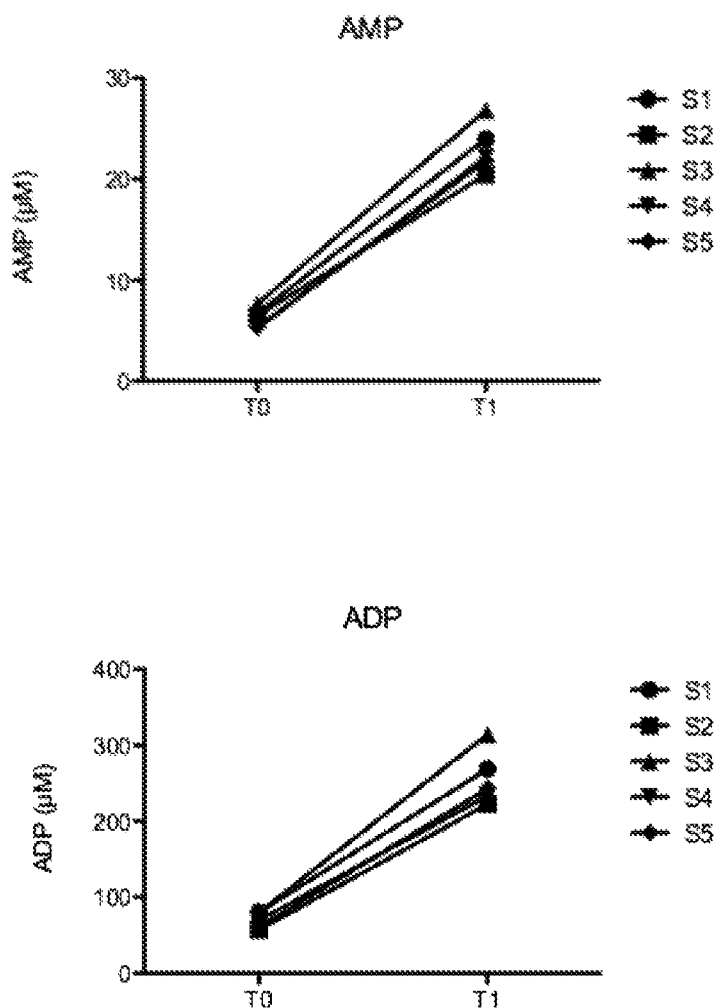
FIG. 1 shows the expression of AMP and ADP in a blood sample of subjects who have assumed a composition according to embodiments of the present description.

In the following description, numerous specific details are given to allow a thorough understanding of embodiments. The embodiments may be implemented in practice without one or more of the specific details, or with other methods, components, materials, etc. In other cases, well-known structures, materials or operations are not shown or described in detail to avoid confusing certain aspects of the embodiments.

Reference throughout this description to "a single embodiment" or "one embodiment" indicates that a particular aspect, structure or characteristic described in relation to the embodiment is included in at least one single embodiment. Therefore, forms of the expressions "a single embodiment" or "one embodiment" at various points throughout the present description do not all necessarily refer to the same embodiment. Moreover, particular aspects, structures or characteristics can be combined in any convenient way in one or more embodiments.

The headings provided here are for convenience only and do not interpret the scope or purpose of the embodiments.

The subject of this description concerns compositions capable of mimicking the effects of caloric restriction, in particular, in preventing and treating prediabetes and diabetes.

The Inventors of the instant application have shown that the disclosed compositions mimic the effects of caloric restriction, in particular, by activating the metabolic pathway of the protein kinase activated by adenosine monophosphate (AMPK). More specifically, the Inventors observed an increase in the quantitative ratio of adenosine monophosphate/adenosine triphosphate (AMP/ATP) and in the quantitative ratio of adenosine diphosphate/adenosine triphosphate (ADP/ATP) in blood samples from subjects who took the disclosed compositions.

An embodiment of the present description provides a composition comprising an active agent which comprises:
  acetylcysteine,
  at least one compound selected from the group consisting of nicotinamide, nicotinamide riboside (NR), nicotinamide mononucleotide (NMN),
  at least one compound selected from polydatin and resveratrol.

Acetylcysteine (2R-acetamido-3-sulfonylpropanoic acid) is a derivative of the amino acid cysteine and has an anti-oxidant activity.

Nicotinamide (pyridine-3-carboxamide), nicotinamide riboside (1-[3,4-dihydroxy-5-(hydroxymethyl)oxolan-2-yl] pyridine-1-3-carboxamide) and nicotinamide mononucleotide (3-carbamoyl-1-[5-O-(hydroxyphosphinate)-β-D-ribofuranosyl]pyridine) are vitamin precursors of NAD+, a coenzyme essential for redox reactions and also a co-substrate of multiple enzymes, including sirtuins.

Polydatin (also known as piceid) is a natural molecule with antioxidant activity that can be extracted, for example, from the roots of a plant, Poligonum *cuspidatum*, originating from North East Asia. Polydatin is able to interact with the epigenome by activating the synthesis of sirtuins, proteins that-in turn-trigger a series of positive reactions ranging from DNA repair, activation of Phase II enzymes (antioxidants), and activation of glutathione-peroxidase (GPX) and glutathione-S-transferase (GST).

Resveratrol (5-[2E-(4-hydroxyphenyl)-ethenyl] benzen-1,3-diol) is a compound belonging to the group of polyphenols, in particular stilbenes, and is a product of plant origin.

The compositions subject of the present description may comprise the components of the active agent in the following quantitative ratios.

Acetylcysteine may be contained in the composition in an amount, by weight, between 60% and 72%, preferably equal to 71% with respect to the weight of the active principle.

In one or more embodiments, at least one compound selected from nicotinamide (NAM), nicotinamide riboside (NR), and nicotinamide mononucleotide (NMN) may be contained in the composition in an amount by weight ranging from 17% to 25% with respect to the weight of the active principle. Preferably, equal to 17% with respect to the weight of the active principle.

At least one compound selected from polydatin and resveratrol may be included in the composition in an amount by weight between 11% and 15%, preferably equal to 12% with respect to the weight of the active principle.

The weight ratio between acetylcysteine and at least one compound selected from polydatin and resveratrol can be between 4:1 and 6.6:1, preferably 6:1.

Preferably, the active agent may comprise acetylcysteine, polydatin, nicotinamide.

Polydatin may be present in an amount by weight between 11% and 15%, preferably in an amount equal to 12% by weight with respect to the total weight of acetylcysteine, nicotinamide, and polydatin.

Nicotinamide may be present in an amount by weight between 17% and 25%, preferably in an amount equal to 17% by weight with respect to the total weight of acetylcysteine, nicotinamide, polydatin.

The weight ratio between acetylcysteine and nicotinamide may be between 2.4:1 and 4.2:1, preferably it is equal to 4.2:1.

The weight ratio between nicotinamide and polydatin may be between 1.4:1 and 1.6:1, preferably 1.4:1.

A composition according to embodiments may comprise the following components in the following quantities: acetylcysteine between 90 mg and 264 mg, nicotinamide between 37.5 mg and 110 mg, polydatin between 22.5 mg and 66 mg.

For example, a composition comprising an active principle in an amount equal to 150 mg may comprise 90 mg of acetylcysteine, 37.5 mg of nicotinamide, 22.5 mg of polydatin; a composition comprising an active principle in an amount equal to 440 mg may comprise 264 mg of acetylcysteine, 110 mg of nicotinamide, 66 mg of polydatin. In one or more embodiments, the composition may consist of acetylcysteine, nicotinamide, polydatin.

In one or more embodiments, the composition may comprise an active agent which comprises, preferably consists of, acetylcysteine, nicotinamide riboside (NR) or nicotinamide mononucleotide (NMN) and resveratrol. NR or NMN may be comprised in an amount comprised between 17% and 25% by weight with respect to the weight of the active principle. Resveratrol may be comprised in an amount comprised between 11% and 15% by weight with respect to the weight of the active principle.

In one or more embodiments, the described compositions may comprise, in addition to the active principle, at least one further component selected from minerals, flavoring substances, additives, such as, for example, gelling agents, or thickeners.

The compositions may be administered in the form of capsules containing a dose of active principle coated with gelling agents, such as, for example, animal proteins, preferably gelatin, vegetable polysaccharides and their derivatives.

In one or more embodiments, the compositions subject of the present description may be administered as nutraceutical compositions or oral nutritional supplements.

In one or more embodiments, the compositions described herein may be used in medicine, in particular, in preventing and/or treating prediabetes and diabetes.

In one or more embodiments, the disclosure provides a method for preventing and treating prediabetes and diabetes in a subject, the method comprising the selection of a composition comprising an active agent containing acetylcysteine, at least one compound selected from nicotinamide (NAM), nicotinamide riboside (NR), nicotinamide mononucleotide (NMN), at least one compound selected from polydatin and resveratrol, and the administration of the composition to the subject. The composition may be administered, for example, in the form of a capsule, preferably 2 capsules per day, each comprising an amount of active ingredient that can be between 150 mg and 440 mg, preferably equal to 294 mg.

The Inventors of the present application have shown that the compositions described make it possible to determine a significant increase in the levels of AMP and the AMP/ATP ratio by favoring the activation of AMPK, as will be evident below.

EXAMPLES

Table 1 presents an illustrative, non-limiting example of composition according to embodiments of the present description.

TABLE 1

| Components Active principle | mg | % | PM (mg/mmoles) | mmoles | % mole fraction |
|---|---|---|---|---|---|
| Polydatin | 35.0 | 11.9 | 390.38 | 0.09 | 5.1 |
| N-acetylcysteine | 210.0 | 71.4 | 163.19 | 1.287 | 72.4 |
| Nicotinamide | 49.0 | 16.7 | 122.13 | 0.40 | 22.5 |
| Total | 294.0 | 100 | | 1.777 | 100 |

The composition of the previous Table 1 can be prepared as follows. The previously selected and weighed components (purchased from the company Solimé S.r.l., Cavriago, Reggio Emilia, Italy) are inserted in sequence into a carefully sanitized paddle mixer (A091). In particular, n-acetylcysteine, polydatin and nicotinamide are mixed thoroughly for at least 10 minutes. Consequently, the mixing is suspended and observed in order to verify the obtainment of a perfectly homogeneous product. Mixing can resume for an additional 10 minutes. When mixing is complete, the entire batch is poured into one or more disposable polyethylene bags, in quantities not exceeding 10 kg per bag. A sample of the product is taken and subjected to organoleptic control for appearance/shape, color, odor and microbiological control for total bacterial count (TBC), yeasts and molds. The product is transferred to a dedicated area (zone 34) pending analytical reports. Following the positive outcome of the carried out analyzes, the mixture is subjected to encapsulation with an automatic encapsulator (A029) at maximum speed 4 (equal to 20,000 cps/h), at the rate of 294 mg of active agent per gelatin capsule (size zero, 90 mg) for a total weight of 384 mg each. At the end of the processing, the product is transferred to an area dedicated to packaging (zone 12) for the blister and cartoning phases.

Methods

Five healthy subjects between the ages of 50 and 82, four males and one female, were selected. All subjects selected for the study signed the informed consent.

The composition was taken in the form of a capsule, 2 capsules/day, approximately before breakfast, for a period of 60 days. The subjects did not change their lifestyle, their usual eating and exercise habits. Immediately before and after the end of the composition-taking period, subjects underwent fasting blood sampling.

Analysis Procedures. HPLC Determination of Nucleotide Levels

Measurement of nucleotides (AMP, ADP and ATP) in the blood was performed using the following pre-analytical method: (A) for oxidized nucleotides, whole blood was mixed with 7.2% perchloric acid (1:2 v/v) and stored at −80° C. for up to 7 days. After centrifuging the thawed sample, 75 µL of 1 M pH 11 borate buffer containing 4 mM EDTA was added to 100 µL of each supernatant, prior to analysis by high performance liquid chromatography (HPLC). (B) For reduced nucleotides, whole blood was mixed with 0.5 M potassium hydroxide (KOH) (1:1 v/v) and stored at −80° C. for up to 4 days. A volume of 250 µL of each sample was diluted with 250 µL of distilled water and filtered with 50 Kda Amicon. The filtrate was analyzed in HPLC. The samples were measured by a standard calibration curve.

Results

As shown in FIG. 1, the composition induced a considerable increase in AMP and ADP in the serum of the five subjects after 6 weeks of oral intake. The difference between the two observation times is highly significant (Student's T test: p=0.000039 for AMP and p=0.00012 for ADP).

The ratios of AMP to ATP and ADP to ATP were therefore considered, as the nutrient detection mechanisms are based not so much on the absolute value of a component as on the ratio of coupled molecules involved in enzymatic reactions.

Figure 2:
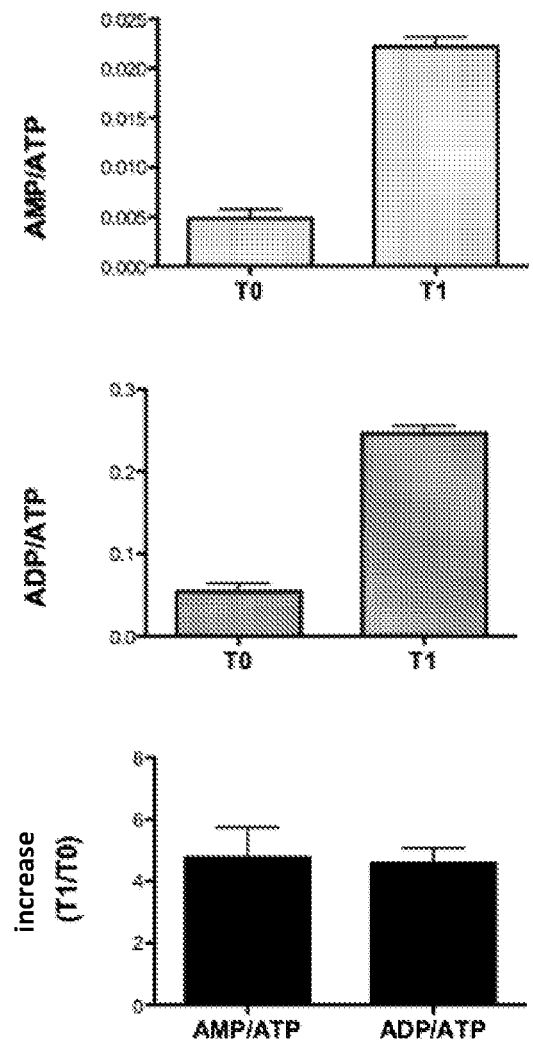
FIG. 2 reports the AMP/ATP and ADP/ATP quantitative ratios in a blood sample of subjects who have assumed a composition according to embodiments of the present description.

FIG. 2 shows the AMP/ATP ratio in the top panel and ADP/ATP in the middle panel at the two times of the study.

The increase in the value of the two ratios is highly significant (p=$2 \times 10^{-5}$ for AMP/ATP and $8 \times 10^{-7}$ for ADP/ATP). The lower panel instead shows the increase in the ratios at the two analysis times: AMP/ATP has an average of 4.76±0.98 SD, while ADP/ATP has an average of 4.58±0.49 SD. These increases are consistent and comparable for both ratios (p=0.56; there is no statistical difference).

These results are completely surprising, also in light of the lack of experimental evidence-to date-showing a similar effect exerted by exogenous molecules on the AMP/ATP and ADP/ATP ratio.

The increase in AMP and, therefore, in the AMP/ATP ratio favors the activation of AMPK. The activation of AMPK, in turn, is one of the most important mechanisms in inducing homeostatic changes, capable of supporting healthy aging, in particular, by promoting the prevention of type 2 diabetes.

It has been shown that the caloric restriction (CR) and physical exercise are effective pro-longevity strategies but, above all, in the prevention of co-morbidities related to unhealthy aging. Among these, prediabetes plays an extremely important role because it is precisely in this condition that metabolic imbalances are in a phase in which it is still possible to intervene to counteract the onset of diabetes and the full-blown metabolic syndrome. Poor adherence to certain dietary, intermittent fasting or exercise programs in an elderly and often sedentary population, however, only fuels a vicious circle in which metabolic imbalances increase and become chronic.

In this context, developing molecules and/or compositions capable of exerting effects similar to those exerted by caloric restriction is of considerable interest, in particular, by causing the inhibition of the mTOR pathway and the activation of sirtuins and AMPK. Generally, formulating enzyme inhibitors is relatively simpler than formulating enzyme activators, as the inhibitor mechanism generally makes use of allosteric competition for the catalytic site of the enzyme or for a binding site to other proteins of the enzyme complex. The formulation of activators is generally more complex.

As for the AMPK enzyme, the predominant physiological mechanism underlying its activation is the increase in AMP and, in particular, the AMP/ATP ratio. This process generally occurs in a condition of caloric restriction, a condition that has solidly proved to be a fundamental pro-longevity target as it leads to metabolic rebalancing characterized by inhibition of anabolic processes and a stimulation of catabolic processes.

Among the inhibited anabolic processes are the synthesis of proteins, rRNA, fatty acids, cholesterol, triglycerides, glycogen, and the transcription of lipogenic and gluconeogenic enzymes. Stimulated catabolic processes include glycolysis, the reabsorption of glucose and fatty acids, the oxidation of fatty acids, mitochondrial biogenesis and autophagy. The inhibition of gluconeogenic enzymes and the activation of glycolysis are two actions that coordinately lead to effective glycemic control. The coordinated regulation of these processes initiated by the increase in AMP, therefore, favors systems of maintenance, recycling of damaged molecules, repairing damage, increasing resistance to stress and promoting cell survival.

Not surprisingly an active search for AMPK-activating molecules has developed. The effectiveness of these molecules taken individually, however, is limited by the fact that they only work in the presence of AMP. Therefore, the increase in AMP remains a fundamental condition for an effective activation of AMPK.

The disclosed compositions induce an endogenous increase in AMP, the physiological stimulus of AMPK activation, mimicking the effects of caloric restriction and/or physical exercise. This is of particular importance in elderly subjects or non-elderly adults who are unwilling to adopt particular diets or physical exercise programs, often due to lack of time to devote to their health.

The set of mechanisms promoted by the increase in AMP mimic the hormetic adaptations induced by moderate stress, which are, in fact, beneficial biological effects promoting longevity. In contrast to chronic and severe stresses, chronological healthy aging can be achieved by moderate and periodic hormetic inducers.

The production of the composition is not limited to these examples, but may have variants, which do not exceed the limits of the claims reported.

Of course, without prejudice to the principle of the invention, which remains the same, the construction details and the embodiments may vary widely with respect to what has been described and illustrated purely by way of example, without departing from the scope of the present invention.

The invention claimed is:

1. A caloric restriction mimetic composition comprising an active agent, said active agent consisting of:
   i) acetylcysteine,
   ii) at least one compound selected in the group consisting of nicotinamide, nicotinamide riboside (NR), nicotinamide mononucleotide (NMN), and
   iii) polydatin.

2. The composition according to claim 1, wherein acetylcysteine is present in an amount comprised between 60% and 72% (weight/weight) of the active agent.

3. The composition according to claim 2, wherein acetylcysteine is present in an amount equal to 71% (weight/weight) of the active agent.

4. The composition according to claim 1, wherein the weight ratio between acetylcysteine and polydatin is comprised between 4:1 and 6.6:1.

5. The composition according to claim 4, wherein the weight ratio between acetylcysteine and polydatin is equal to 6:1.

6. The composition according to claim 1, wherein said active agent consists of acetylcysteine, nicotinamide, and polydatin.

7. The composition according to claim 6, wherein polydatin is present in an amount by weight comprised between 11% and 15% with respect to the total weight of acetylcysteine, nicotinamide, and polydatin.

8. The composition according to claim 7, wherein polydatin is present in an amount equal to 12% by weight with respect to the total weight of acetylcysteine, nicotinamide, polydatin.

9. The composition according to claim 6, wherein nicotinamide is present in an amount by weight between 17% and 25% with respect to the total weight of acetylcysteine, nicotinamide, and polydatin.

10. The composition according to claim 9, wherein nicotinamide is present in an amount equal to 17% by weight with respect to the total weight of acetylcysteine, nicotinamide, polydatin.

11. The composition according to claim 1, wherein the weight ratio between acetylcysteine and nicotinamide is comprised between 2.4:1 and 4.2:1.

12. The composition according to claim 1, wherein the weight ratio between nicotinamide and polydatin is comprised between 1.4:1 and 1.6:1.

13. The composition according to claim 12, wherein the weight ratio between nicotinamide and polydatin is 1.4:1.

14. The composition according to claim 1, wherein the weight ratio between acetylcysteine and nicotinamide is equal to 4.2:1.

15. A method of treating a disease selected from prediabetes and diabetes, comprising administering to a subject in need thereof a therapeutically effective amount of the composition according to claim 1.

16. A method of treating co-morbidities associated with aging, comprising administering to a subject in need thereof a therapeutically effective amount of the composition according to claim 1.

* * * * *